United States Patent [19]
Hong

[11] Patent Number: 5,991,248
[45] Date of Patent: Nov. 23, 1999

[54] APPARATUS AND METHOD FOR CONTROLLING A TRACKING BALANCE OF AN OPTICAL DISK PLAYER

[75] Inventor: Chung-Seon Hong, Seoul, Rep. of Korea

[73] Assignee: Daewoo Electronics Co., Ltd., Seoul, Rep. of Korea

[21] Appl. No.: 08/941,342

[22] Filed: Sep. 30, 1997

[30] Foreign Application Priority Data

Sep. 30, 1996 [KR] Rep. of Korea ....................... 96-42986

[51] Int. Cl.⁶ ........................................................ G11B 7/00
[52] U.S. Cl. ..................................... 369/44.28; 369/44.35
[58] Field of Search ............................... 369/44.27, 44.28, 369/44.29, 44.32, 32, 44.35, 44.34

[56] References Cited

U.S. PATENT DOCUMENTS

| | | | |
|---|---|---|---|
| 4,817,069 | 3/1989 | Shigemori | 369/32 |
| 4,899,325 | 2/1990 | Kasuhara et al. | 369/32 |
| 5,710,720 | 1/1998 | Algrain et al. | 360/77.18 |

*Primary Examiner*—Nabil Hindi
*Attorney, Agent, or Firm*—Jacobson, Price, Holman & Stern, PLLC

[57] ABSTRACT

The apparatus for controlling the tracking balance of the optical disk player generates a tracking balance control signal removing a DC component from a tracking error caused by installing positions of a disk, a photo diode, a laser diode, and an object lens. A feed-back signal which is generated in a control part controls the tracking balance control signal. The control part measures a duration time of logic high from a logic error signal obtained from the tracking error signal and counts the number of the logic high which is in the predetermined time duration. When the counted value is equal to or smaller than a predetermined number, the feed-back signal for correcting the tracking balance is generated.

5 Claims, 4 Drawing Sheets

APPARATUS AND METHOD FOR CONTROLLING A TRACKING BALANCE OF AN OPTICAL DISK PLAYER

BACKGROUND OF THE INVENTION

1. Field of the Invention

The present invention relates to an optical disk player, and more particularly to an apparatus and method for controlling a tracking balance of an optical disk player which automatically controls a tracking error due to installing positions of a disk, a photo diode, a laser diode, and an object lens.

2. Description of the Prior Art

Data recording/reproducing apparatuses using optical disks such as a laser disk and a compact disk have been commercially available in recent years. In the compact disk, a signal is recorded on a track arranged helical in a direction from an inner side toward an outer side, of which the distance between adjacent tracks, i.e., track pitch of a high density, is about 1.6 $\mu$m. In order to record or read out data from the optical disk, a laser beam is irradiated onto a data recording track and the quantity of the light reflected from the disk is converted into an electric signal, thereby reading the data. When the tracks are helical formed on the optical disk, since the sectors of a single track are not equidistant from the center of the rotation of the disk due to an eccentricity on the disk, tracking control is necessary in the read mode to accurately irradiate the track with a laser beam. Even if the tracks are concentrically formed, sectors of a single track are not equidistant from the center of the rotation of the disk due to the eccentricity in the disk, and therefore, tracking control is essential. It is necessary to control the position of the laser beam to be incident on the track of turning disk.

On the other hand, a motor for turning a compact disk causes a phenomenon that moves the track inwardly and outwardly at the time of turning, and therefore the pick-up follows this and a device controls positioning on a proper track which is called a tracking servo. A servo error signal for indicating how much deviation from an optimum state occurred is required for all servos. The compact disk player applies various optical methods to produce the servo error. This tracking control has been conventionally performed by a one beam method using a single laser beam or a three beam method wherein the single laser beam is separated into three beams. The three beam method is more often used because it is more stable for the tilting of a disk or the defect of a disk than the one beam method. One example of this three beam tracking method is disclosed in U.S. Pat. No. 5,128,914.

However, during the process to perform the tracking servo by using the three beam system, it is difficult to accurately correct the tracking servo when the tracking servo is unbalanced during the turning of the optical disk because the tracking error caused by the lens is fixed value at the time to make the tracking servo.

SUMMARY OF THE INVENTION

Therefore, in the present invention to solve the above mentioned problem, it is an object of the present invention to provide the apparatus and method for controlling the tracking balance of the optical disk player which automatically controls the tracking servo by removing DC component of the tracking error due to installing positions of the disk, the photo diode, the laser diode, and the object lens.

To achieve the above object of the present invention, an apparatus for controlling the tracking balance in an optical disk player comprises:

an optical pick-up part to irradiate at least a sub-beam and generate current signals corresponding to the quantity of the light reflected from the disk;

a current-voltage converting part to convert the current signals into voltage signals corresponding thereto;

a tracking error detecting part to detect a tracking error from the voltage signals;

a logic determining part to detect a logic level of the error signal;

a control part to generate a feed-back signal from the logic signal for compensating the tracking error;

a tracking error controlling part for returning a tracking error correction signal to the tracking error detecting part depending on the feed-back signal; and a balance correcting part for generating position control signals of a photo diode, a laser diode, and an object lens from the tracking error signal corrected by an output signal of the tracking error control part.

To achieve the above object of the present invention, in a three beam tracking method which generates a tracking error from a light reflected from a turning disk, a method for controlling the tracking balance in an optical disk player comprises:

an initialization step S100 to set a gain at maximum value and initialize variables when the disk is loaded;

a level selection step S200 to select one of tracking levels dividing the tracking error into a predetermined number of levels and to start a timer;

a logic error signal fetching step S300 to fetch a logic error signal from a logic determining part when a time variable meets a predetermined qualification depending on the operation of the timer;

a fetching termination decision step S400 to terminate the fetching operation of the logic error signal when a time limit expires; and a correction signal output step S500 to output a feed-back signal when a value returned from the logic error signal fetching step S300 meets a predetermined qualification.

The apparatus and method for controlling the tracking balance of the optical disk player according to the present invention generates a tracking error signal corrected error caused by installing positions of the photo diode, the laser diode, and the object lens when a new disk is installed on the player. The balance correcting part has the tracking error signal to correct the positions of the photo diode, the laser diode, and the object lens. Therefore, the tracking balance can be automatically controlled by the apparatus and method for controlling the tracking balance according to the present invention. The optical disk player operates in stable condition, and thus the reading data are good in quality.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

An embodiment of the apparatus and method for controlling the tracking balance of the optical disk player according to the present invention will be described in more detail with reference to the accompanying drawings.

Figure 1:
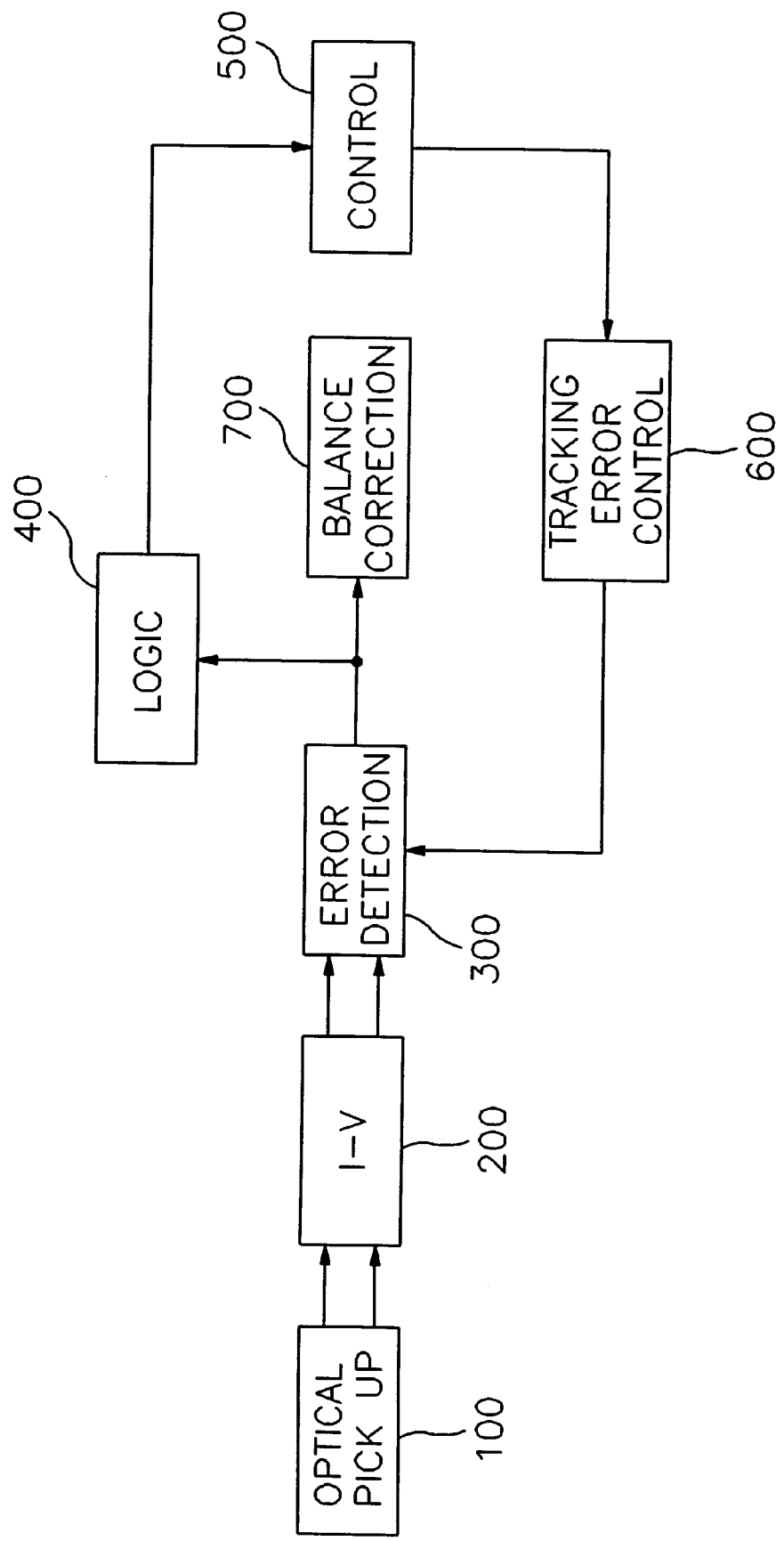
FIG. 1 is a block diagram showing an apparatus for controlling a tracking balance of an optical disk player according to the present invention.
Figure 2:
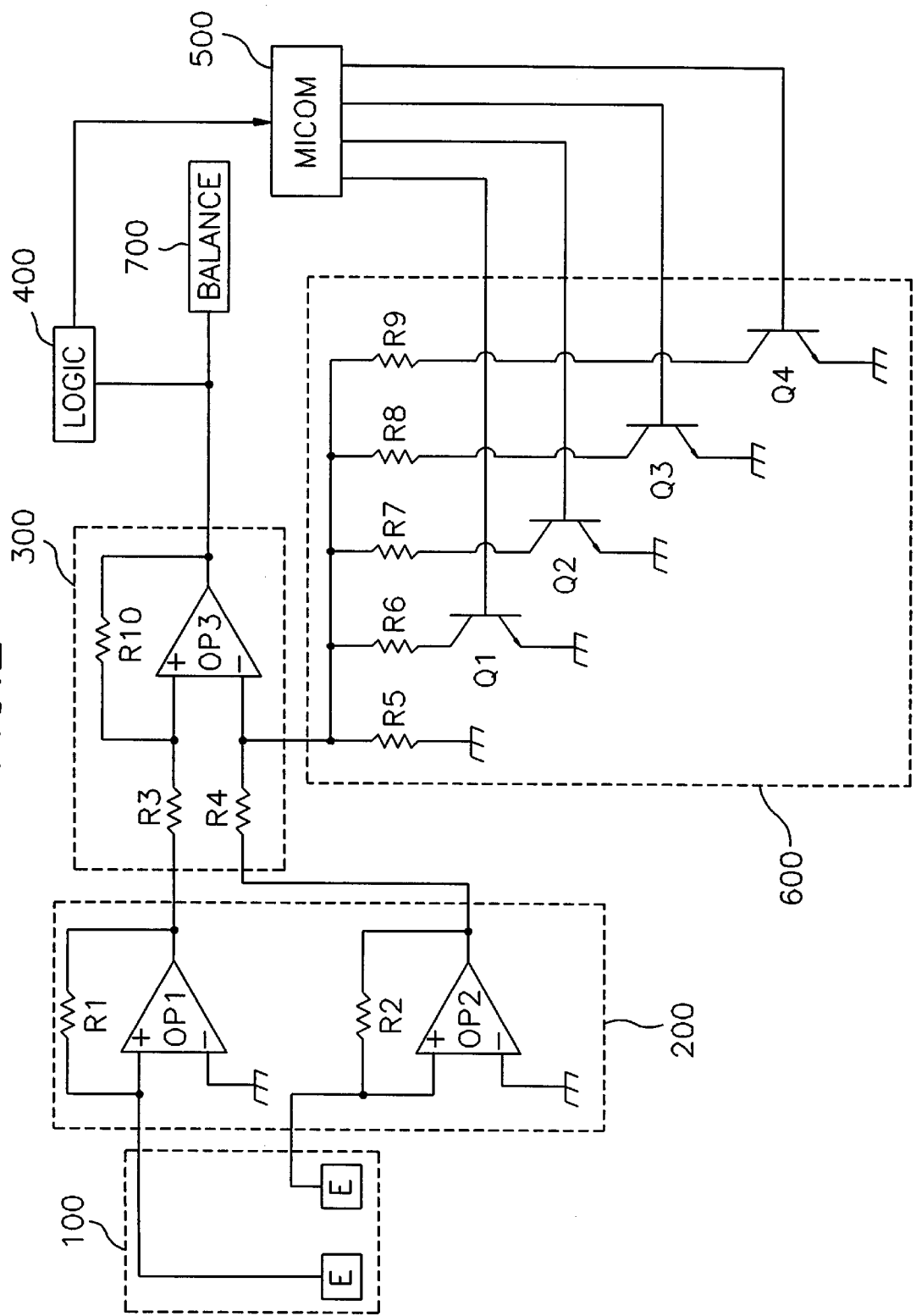
FIG. 2 is a circuit diagram of the apparatus for controlling the tracking balance of the optical disk player according to an embodiment of the present invention.

FIG. 1 is a block diagram showing an apparatus for controlling a tracking balance of an optical disk player according to the present invention, and FIG. 2 is a circuit diagram of the apparatus for controlling the tracking balance of the optical disk player according to an embodiment of the present invention.

The apparatus for controlling the tracking balance of the optical disk player comprises an optical pick-up part 100 which irradiates at least a sub-beam to a disk and generates current signals corresponding to the quantity of a light reflected from the disk when the optical disk is installed on the optical disk player. A current-voltage converting part converts the current signals outputted from the optical pick up part 100 into voltage signals corresponding thereto. A tracking error detecting part detects a tracking error signal TE from the voltage signals outputted from the current-voltage converting part 200. The tracking error signal TE outputted from the tracking error detection part 300 is a continuous signal. A logic determining part 400 generates a logic signal of the tracking error signal TE. A MICOM 500 has the logic signal. The MICOM 500 generates a feed-back signal from the logic signal to compensate the tracking error. A tracking error controlling part 600 has the feed-back signal and generates a tracking error compensating signal from the feed-back signal. The tracking error compensating signal returns to the tracking error detecting part 300. A balance correcting part 700 generates the tracking error signal corrected by the tracking compensating signal to control the positions of the photo diode, the laser diode, and the object lens.

Figure 3:
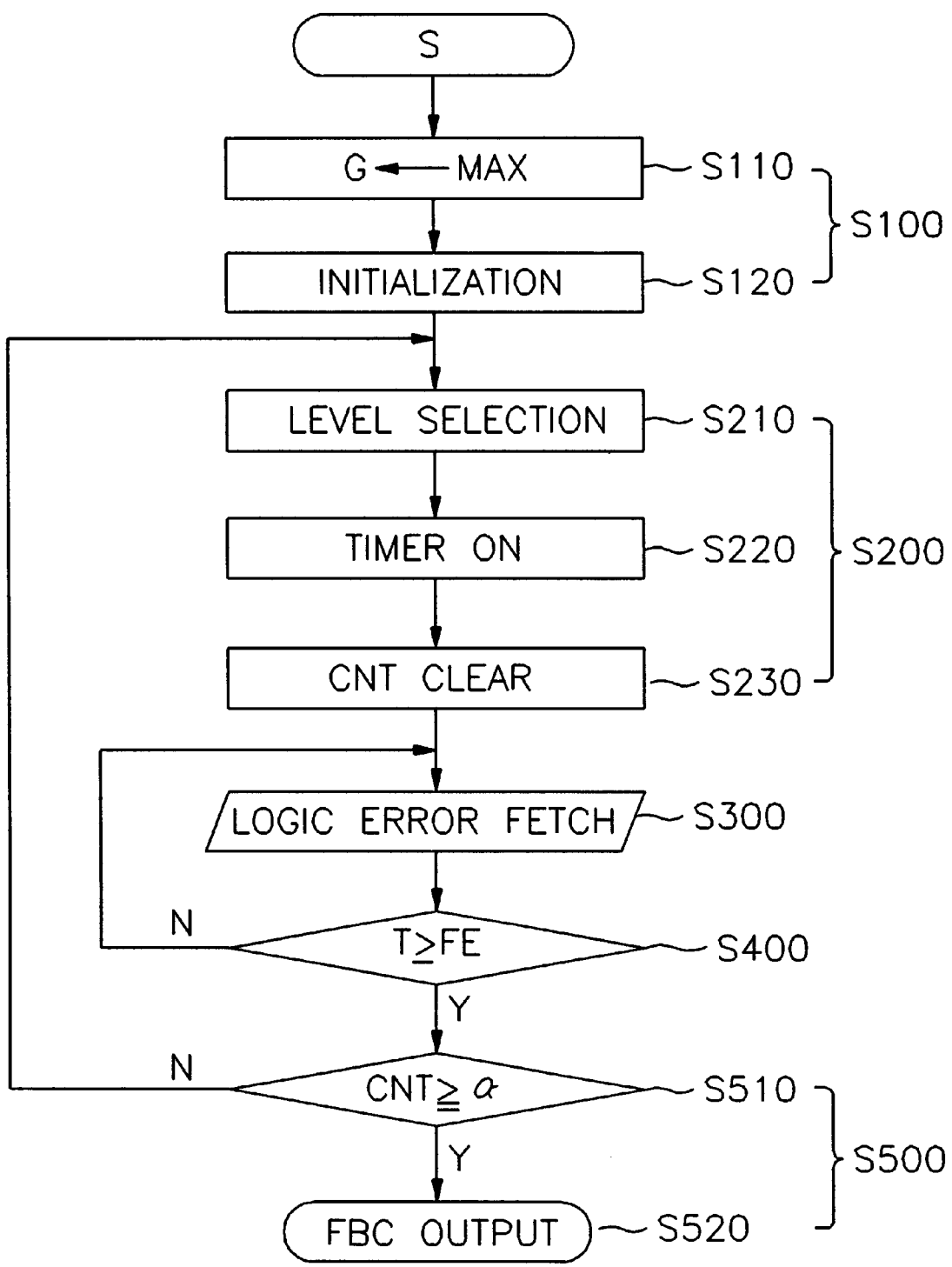
FIG. 3 is a flow chart showing a method for controlling the tracking balance of the optical disk player according to the present invention.
Figure 4:
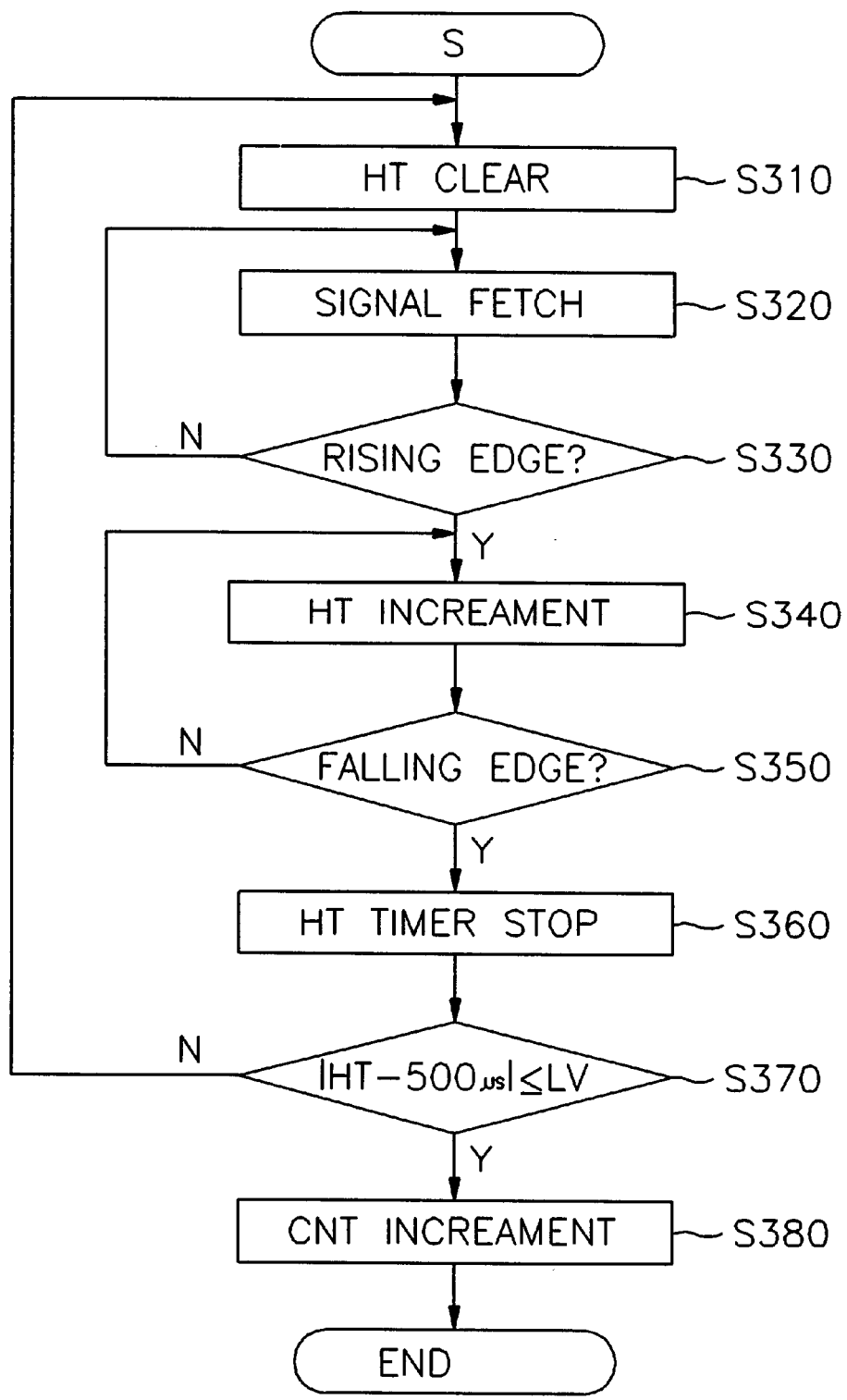
FIG. 4 is a flow chart showing a logic error fetching step of the method for controlling the tracking balance of the optical disk player according to the present invention.

In FIG. 2, according to an embodiment of the present invention, E and F of the optical pick-up part 100 irradiate side beams to and receive lights reflected from the turning disk. The current-voltage converting part 200 comprises a first operational amplifier OP1 and a second operational amplifier OP2. The received signals are current signals. The first operational amplifier OP1 has one of the current signals. The second operational amplifier OP2 has the other current signal. The first operational amplifier OP1 and the second operational amplifier OP2 are connected to terminals of third operational amplifier OP3 through resistors R3, R4. The first operational amplifier OP1 and the second operational amplifier OP2 convert the current signals from the E and F into the voltage signals and output the converted voltage signals into the tracking error detecting part 300. The third operational amplifier OP3 compares the voltage signals received by the first operational amplifier OP1 and the second operational amplifier OP2 and thus outputs the tracking error signal TE. The tracking error detecting part 300 is connected with a balance correcting part 700 to adjust the tracking balance by correcting the positions of the photo diode, the laser diode, and the object lens. The tracking error detecting part 300 also connects with a logic determining part 400. The balance correcting part 700 and the logic determining part 400 stand in a row. The logic determining part 400 converts the tracking error signal TE into the logic signal. A MICOM 500 has the logic signal for generating the feed-back signal to reduce the tracking error. The feed-back signal is the signal to reduce the tracking error depending on the logic signal. A tracking error control part 600 connects with the tracking error detecting part 300 and has the feedback signal. The tracking error control part 600 comprises a number of parallel resistors and a number of transistors as the switches. In this embodiment, the number of parallel resistors is five, i.e., R5, R6, R7, R8, R9 and the number of transistors is four, i.e., Q1, Q2, Q3, Q4. A first parallel resistor R5 connects between the positive terminal of the third operational amplifier OP3 and the ground. The first resistor R5 is a basic resistor to transfer the tracking error correction signal depending on the feed-back signal to the tracking error detecting part 300. A second parallel resistor R6 has an end connected in parallel with the first parallel resistor R5 and the other end connected with the ground through a first transistor Q1. The other resistors R7, R8, R9 connect with the other transistors Q2, Q3, Q4 as above described method. In the present embodiment, the number of the parallel resistors for controlling the magnitude of the tracking error correction signal can be reduced or increased depending on a resolution and a processing time thereof. FIG. 3 is a flow chart showing a method for controlling the tracking balance of the optical disk player according to the present invention, and FIG. 4 is a flow chart showing a logic error fetching step of the method for controlling the tracking balance of the optical disk player according to the present invention. The method for controlling the tracking balance of the optical disk player according to the present invention is described below with reference to the FIG. 3 and FIG. 4.

When the disk is loaded on the disk player, the MICOM executes an initialization step S100. The initialization step S100 has a gain setting up step S110 and a variable initialization step S120. In the gain setting up step S110, the MICOM sets a gain G up to the maximum value MAX to easily control the tracking balance. In the variable initialization step S120, variables (T, HT, LV, CNT, FE, α, etc.) are initialized for determining the feed-back signal. The 'T' is assigned to a time variable. The 'HT' is assigned to a time duration in which the logic signal is HIGH. The 'LV' is assigned to a 'HT' limit variable. The 'CNT' stores the number of repetitions of the logic HIGH during the predetermined time. The 'FE' is assigned to a signal fetching termination point. The 'α' is a qualification variable for outputting a feed-back signal. When the initialization step S100 has been executed, a level selection step S200 is executed. The level selection step S200 has an error level selection step S210, a timer start operation step S220, and a count variable clear step S230. In the error level selection step S210, one of the tracking error levels dividing predetermined levels(in the present embodiment, 8 levels) is selected. The starting level in the present embodiment is the highest level. The timer start operation step S220 is executed. The count variable clear step S230 is executed in selecting the new level. When the level selection step S200 has been executed, a logic error fetching step S300 is executed. The logic error fetching step S300 fetches the logic error signal from the logic determination part 400, counts the number of repetitions of the logic HIGH of the logic error signal, and returns the count variable CNT to the next step. The logic error fetching step S300 is repeatedly executed until time is finished. In a fetching termination decision step S400, whether the logic error fetching step S300 is terminated or not is decided. In the fetching termination decision step S400, the time variable T is compared with the signal fetching termination variable FE. When the time variable T is smaller than the signal fetching termination variable FE, the logic error fetching step S300 is reexecuted. However, when the time variable T is equal to or larger than the signal fetching termination variable FE, a correction signal output step S500 is executed. The correction signal output step S500 has a feed-back decision step S510 comparing the variable CNT returned from the logic error fetching step S300 with the predetermined setting up value α and a feed-back signal output step S520 outputting the feed-back signal depending on the result of the feed-back decision step S510. In the feed-back decision step S510, when the variable CNT is smaller than the predetermined setting up value α, the level is changed in the level selection step S210. However, when the variable CNT is equal to or larger than the predetermined setting up value α, the MICOM outputs the feed-back signal into the tracking error control part 600.

The logic error fetching step S300 has an HT clear step S310 which clears the variable HT for measuring the duration time of the logic HIGH of the logic error signal and starts the timer, a signal fetching step S320 for fetching the logic error signal, a rising edge detection step S330 for detecting the rising edge of the logic error signal, a variable HT increment step S340 increasing the variable HT for measuring the duration time of the logic HIGH when the rising edge is detected, a falling edge detection step S350 for detecting the falling edge of the logic error signal, a duration time save step S360 which stops the HT timer and saves the duration time of the logic HIGH into the HIGH time variable HT when the falling edge is detected, a duration time comparison step S370 for comparing the |HT-500 μs| with the limit variable LV, and a count variable increment step S380 for increasing the count variable CNT depending on the result of the duration time comparison step S370. In the duration time comparison step S370, when the |HT-500 μs| is larger than the limit variable LV, the HT clear step S310 is reexecuted. Meanwhile, when |HT-500 μs| is smaller than or equal to the limit variable LV the count variable increment step S380 is executed. The correction signal output step S500 utilizes the saved count variable CNT after processing the fetching termination decision step S400.

In the present embodiment of the invention, the FE is 200 ms, the LV is 50 μs, and the α is 9. The variable for fetching termination point FE is decided by referring the number of rotations of a spindle motor, and the variable α is obtained by referring the value of the variable FE.

Meanwhile, in the present embodiment of this invention, the feed-back signal is obtained by starting from not only the highest level of the tracking error, but also the lowest level of the tracking error. Also, the loop as described above can be executed two times for obtaining the more precise feed-back signal. First, in the level selection step S210, we can obtain a first feed-back signal by executing the above steps after setting the start level up the highest level of the tracking error. Second, we can also obtain a second feed-back signal by executing the above steps after setting up the start level which is the lowest level of the tracking error. An average value is obtained from the first feed-back signal and the second feed-back signal. The final feed-back signal is obtained by the average value and then the complete loop is finished.

The apparatus and method for controlling the tracking balance of the optical disk player according to the present invention generates a tracking error signal corrected error caused by installing positions of the photo diode, the laser diode, and the object lens when a new disk is installed on the player. The balance correcting part has the tracking error signal to correct the positions of the photo diode, the laser diode, and the object lens. Therefore, the tracking balance can be automatically controlled by the apparatus and method for controlling the tracking balance according to the present invention. The optical disk player operates in stable condition, and thus the reading data are good in quality. While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for controlling the tracking balance in an optical disk player comprising:

an optical pick-up part to irradiate at least a sub-beam and generate current signals corresponding to the quantity of the light reflected from the disk;

a current-voltage converting part to convert the current signals into voltage signals corresponding thereto;

a tracking error detecting part to detect a tracking error from the voltage signals;

a logic determining part to detect a logic level of the error signal;

a control part to generate a feed-back signal from the logic signal for compensating the tracking error;

a tracking error controlling part for returning a tracking error correction signal to the tracking error detecting part depending on the feed-back signal; and a balance correcting part for generating position control signals of a photo diode, a laser diode, and an object lens from the tracking error signal corrected by an output signal of the tracking error control part.

2. The apparatus for controlling the tracking balance in an optical disk player according to the claim 1, wherein said tracking error control part comprises N parallel resistors and (N–1) switching components.

3. A method for controlling the tracking balance in an optical disk player in a three beam tracking method which generates a tracking error from a light reflected from a turning disk comprising:

an initialization step S100 to set a gain at the maximum value and initialize variables like a time variable T, a variable HT for measuring a logic HIGH duration time, a limit value LV for limiting the variable HT, a variable CNT for the number of repetitions of the logic HIGH, a signal fetching determination variable FE, and a variable a for showing an output condition of a feed-back signal when the disk is loaded;

a level selection step S200 to select one of tracking levels dividing the tracking error into a predetermined number of levels and to start a timer;

a logic error signal fetching step S300 to fetch a logic error signal from a logic determining part when a time variable meets a predetermined qualification depending on the operation of the timer;

a fetching termination decision step S400 to terminate the fetching operation of the logic error signal when a time limit expires; and a correction signal output step S500 to output a feed-back signal when a value returned from the logic error signal fetching step S300 meets a predetermined qualification.

4. The method for controlling the tracking balance in an optical disk player according to the claim 3, wherein said logic error fetching step S300 comprises:

an HT clear step S310 which clears the variable HT for measuring the duration time of the logic HIGH of the logic error signal and starts the timer;

a signal fetching step S320 for fetching the logic error signal;

a rising edge detection step S330 for detecting the rising edge of the logic error signal;

a variable HT increment step S340 increasing the variable HT for measuring the duration time of the logic HIGH when the rising edge is detected;

a falling edge detection step S350 for detecting the falling edge of the logic error signal;

a duration time save step S360 which stops the HT timer and saves the duration time of the logic HIGH into the HIGH time variable HT when the falling edge is detected;

a duration time comparison step S370 for comparing the |HT-500 µs| with the limit variable LV;

a count variable increment step S380 for increasing the count variable CNT depending on the result of the duration time comparison step S370; and in the duration time comparison step S370, when the |HT-500 µs| is larger than the limit variable LV, the HT clear step S310 is reexecuted, but when |HT-500 µs| is smaller than or equal to the limit variable LV, the count variable increment step S380 is executed.

5. A method for controlling the tracking balance in an optical disk player in a three beam tracking method which generates a tracking error from a light reflected from a turning disk comprising:

a gain setting up step S110 for setting a gain at the maximum value when the disk is loaded on the disk player;

a variable initialization step S120 for initializing variables like a time variable T, a variable HT for measuring a logic HIGH duration time, a limit value LV for limiting the variable HT, a variable CNT for the number of repetitions of the logic HIGH, a signal fetching determination variable FE, and a variable α for showing an output condition of a feed-back signal;

an error level selection step S210 for selecting one of tracking levels dividing the tracking error into a predetermined number of levels;

a timer starting operation step S220 for starting a timer;

a count variable clear step S230 for clearing the count variable CNT when the new level is selected;

an HT clear step S310 for clearing the variable HT to measure a duration time of a logic HIGH of a logic error signal and starting the timer;

a signal fetching step S320 for fetching the logic error signal;

a rising edge detection step S330 for detecting the rising edge from the logic error signal;

a variable HT increment step S340 for increasing the variable HT to measure the duration time of the logic HIGH when the rising edge is detected;

a falling edge detection step S350 for detecting the falling edge from the logic error signal;

a duration time save step S360 to stop the HT timer and save the duration time of the logic HIGH into the HIGH time variable HT when the falling edge is detected;

a duration time comparison step S370 for comparing the |HT-500 µs| with the limit variable LV, in the duration time comparison step S370, and when the |HT-500 µs| is larger than the limit variable LV, the HT clear step S310 is reexecuted;

a count variable increment step S380 for increasing the count variable CNT depending on the result of the duration time comparison step S370 when |HT-500 µs| is smaller than or equal to the limit variable LV;

a fetching termination decision step S400 to reexecute the HT clear step S310 when the time variable T is smaller than the signal fetching determination variable FE and terminate the fetching operation of the logic error signal when the time variable T is equal to or larger than the signal fetching determination variable FE; and a correction signal output step S500 to reexecute the level selection step S210 when the count variable CNT is smaller than the variable α for feed-back signal output condition and output a feed-back signal into a tracking error control part when the count variable CNT is equal to or larger than the variable a for feed-back signal output condition.

* * * * *